US009415689B2

(12) United States Patent
Wäller et al.

(10) Patent No.: US 9,415,689 B2
(45) Date of Patent: Aug. 16, 2016

(54) METHOD AND DEVICE FOR GENERATING A USER RECOGNITION SIGNAL

(75) Inventors: Christoph Wäller, Braunschweig (DE); Lennart Bendewald, Wolfsburg (DE); Katharina Bachfischer, Düsseldorf (DE); Lorenz Bohrer, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 1103 days.

(21) Appl. No.: 12/920,276
(22) PCT Filed: Mar. 10, 2009
(86) PCT No.: PCT/EP2009/001806
§ 371 (c)(1),
(2), (4) Date: Jan. 18, 2011
(87) PCT Pub. No.: WO2009/112271
PCT Pub. Date: Sep. 17, 2009

(65) Prior Publication Data
US 2011/0121958 A1 May 26, 2011

(30) Foreign Application Priority Data
Mar. 10, 2008 (DE) .......................... 10 2008 013 476

(51) Int. Cl.
*B60Q 1/00* (2006.01)
*B60K 37/06* (2006.01)
(Continued)

(52) U.S. Cl.
CPC ................. *B60K 37/06* (2013.01); *B60K 35/00* (2013.01); *G06F 3/011* (2013.01); *B60K 2350/1012* (2013.01); *B60K 2350/1024* (2013.01); *B60K 2350/1028* (2013.01)

(58) Field of Classification Search
CPC ........... B60K 37/06; B60K 2350/1024; B60K 35/00; B60K 2350/1028; B60K 2350/1012; B60K 37/04; G06F 3/011; G06F 3/04883; G06F 3/04886

USPC .............. 340/5.74, 438, 441, 825.71, 286.01, 340/667, 436, 666
See application file for complete search history.

(56) References Cited

U.S. PATENT DOCUMENTS

| 6,771,161 | B1* | 8/2004 | Doi ..................... B60R 25/2027 340/10.34 |
| 7,467,037 | B2 | 12/2008 | Donk et al. ..................... 701/36 |

(Continued)

FOREIGN PATENT DOCUMENTS

| CN | 1746835 A | 3/2006 | .............. G06F 3/033 |
| DE | 4121180 A1 | 1/1993 | .............. G06F 3/033 |

(Continued)

OTHER PUBLICATIONS

International PCT Search Report, PCT/EP2009/001806, 2 pages, Mailed Jun. 23, 2009.

*Primary Examiner* — An T Nguyen
(74) *Attorney, Agent, or Firm* — Slayden Grubert Beard PLLC

(57) ABSTRACT

In a device and a method to produce a user recognition signal upon an actuation by a user in a vehicle using a control unit linked with a transmitter and receiver which are disposed relative to one another to set up a user-specific high frequency transmission path therebetween upon actuation by the the user, at least one HF signal is provided and transferred through the body of the user, the HF transfer is evaluated to determine the user-specific transmission path to identify the user, and a user recognition signal is produced that identifies the user, wherein using at least one detection unit an action of the user is detected or an action presence is monitored, and in the detection of the action an action signal is produced, and the transmitter only provides the one HF transmission signal after or upon the existence of an action signal.

17 Claims, 6 Drawing Sheets

(51) Int. Cl.
*B60K 35/00* (2006.01)
*G06F 3/01* (2006.01)

(56) References Cited

U.S. PATENT DOCUMENTS

| | | | | |
|---|---|---|---|---|
| 7,969,423 | B2 * | 6/2011 | Kawabe | H04N 13/0404 345/173 |
| 2002/0030585 | A1 * | 3/2002 | Doi | A61B 5/0028 340/5.64 |
| 2004/0160320 | A1 * | 8/2004 | Edwards | B60N 2/002 340/539.21 |
| 2006/0220788 | A1 * | 10/2006 | Dietz et al. | 340/5.74 |
| 2006/0261672 | A1 * | 11/2006 | Richter | 307/10.1 |
| 2009/0269263 | A1 | 10/2009 | Rohart et al. | 423/213.2 |

FOREIGN PATENT DOCUMENTS

| | | | | |
|---|---|---|---|---|
| DE | 10305341 A1 | 8/2004 | | B60R 16/02 |
| DE | 102004033275 A1 * | 2/2006 | | |
| DE | 112004002257 T5 | 12/2006 | | B60K 35/00 |
| DE | 102006028046 A1 | 12/2007 | | B60K 35/00 |
| DE | 102007011543 A1 | 3/2008 | | G09F 9/00 |
| DE | 102007053051 A1 | 5/2009 | | B60K 35/00 |
| EP | 1710672 A2 | 10/2006 | | G06F 3/044 |
| GB | 2428094 A | 1/2007 | | B60K 37/06 |
| WO | 2004/022388 A1 | 3/2004 | | B60R 16/02 |
| WO | 2005/073834 A2 | 8/2005 | | G06F 3/033 |
| WO | 2007/000514 A2 | 1/2007 | | B01D 53/94 |

* cited by examiner

METHOD AND DEVICE FOR GENERATING A USER RECOGNITION SIGNAL

CROSS-REFERENCE TO RELATED APPLICATIONS

This application is a U.S. National Stage Application of International Application No. PCT/EP2009/001806 filed Mar. 10, 2009, which designates the United States of America, and claims priority to German Application No. 10 2008 013 476.7 filed Mar. 10, 2008, the contents of which are hereby incorporated by reference in their entirety.

TECHNICAL FIELD

The invention relates to a device and a method for generating a user recognition signal upon an actuation action in a vehicle.

BACKGROUND

In modern motor vehicles, which often comprise a plurality of convenience functions, there is a rising demand to be able to distinguish between the different users of the motor vehicle, in particular upon an actuation of control elements. For example, this applies, however is not limited to, a utilization of dual view or multi view displays, which depict different display contents in different viewing angles. For example, such dual view or multi view display Devices are arranged in motor vehicles in a center console between a driver and a co-driver. The driver and the co-driver may simultaneously observe differing display contents. When such a dual view or multi view display in addition is coupled with a touch-sensitive spatial resolution sensor and for example is formed as a touchscreen, such a user input may be detected by way of touching the display surface. Here, associated with the touching position is an action, function or the like which is correlated with a respective function, action or the like which is displayed at the touching position. It results therefrom that it is required for this purpose to detect which user, the driver or the co-driver, has touched the display surface.

Also in further operating scenarios in motor vehicles, which do not comprise a dual view or multi view display device, it is reasonable or required to carry out a user recognition. For example, in order to avoid a distraction of a driver from road traffic, while driving it is reasonable to limit the use of individual functionalities requiring a complex operation, for example those of a multimedia system, to a co-driver.

When user-specific settings are carried out control elements may be eliminated when a user recognition occurs. In the case of a seat heating control that is designed individually for each seat, for example one control element is sufficient, if in addition a user recognition is carried out which generates a user recognition signal indicating whether the driver or the co-driver has actuated the control element.

Different systems for a user recognition and a driver/co-driver discrimination, respectively, have been proposed in prior art.

For example, described in EP 1 710 672 A2 is a system comprising a user discrimination control and a method for operating a system comprising a personalized user control. The system has conductive surfaces which are arranged adjacent to each control element. A transmitter is connected to the conductive surfaces. The transmitter emits a unique signal to each conductive surface. Further, arranged nearby the users of the control elements are electrodes which are each coupled with a receiver. When the user actuates one of the control elements, a capacitive coupling of the respective unique signal into the body of the user is carried out. The user forms a HF transmission path between the conductive surface and the electrode. The signal received by the receiver is evaluated in order to output a user recognition signal which identifies the user as the driver or the co-driver.

Described in GB 2 428 094 A is a control device for an input device which distinguishes at least between a first and a second user based on a user recognition signal which is received from one of the users. For example, antennae are arranged in the seats for this purpose which are coupled with transmission units that generate differing high frequency signals. These are coupled into the user sitting on the seat by means of the respective antenna arranged in the seat and are transmitted via the body of the user. When one of the users touches the touchscreen the HF signal, transmitted by means of the body of the user forming a HF transmission path and coupled into the touchscreen, is measured. The coupled HF signal is evaluated and the user recognition is carried out by means of the evaluation of the HF transmission.

Such a system is reliable, however has the disadvantage, that high frequency signals are coupled into the users constantly, even when no actuation of a control element is intended or carried out.

SUMMARY

According to various embodiments, a device for generating a user recognition signal and a respective method can be provided by which an adverse environmental effect and/or a harmful influence of the surrounding area is reduced, for example energy consumption and consumption of resources, and/or a signal coupling of high frequency signals into the body of users of motor vehicles with respect to user recognition devices and methods of the kind mentioned at the beginning may be reduced.

According to an embodiment, a device for generating a user recognition signal upon an actuation action of at least one user out of several users in a vehicle, comprising a discrimination device to generate the user recognition signal identifying at least one of the users, wherein at least one detection unit, by means of which upon a detection of an action of one of the users at least one action signal is generated, is communicatively coupled with the discrimination device, so that the discrimination device is or will be activated only after or upon an existence of the one action signal.

According to a further embodiment, the discrimination device may comprise: a control unit as well as transmitting means and receiving means which are associated with the control unit and are located with respect to each other such that between them upon the actuation action of the at least one user via his/her body a user-specific high frequency transmission path is formed, by means of which a HF signal is transmitted, wherein the control unit is designed to evaluate the HF signal transmission in order to generate the user recognition signal identifying the at least one of the users, wherein the at least one detection unit, by means of which upon a detection of an action of one of the users at least one action signal is generated, is coupled with an activation unit and the activation unit is designed to activate the transmitting means only after or upon an existence of the one action signal. According to a further embodiment, the at least one detection unit may comprise at least one approach detection unit located in spatial proximity to at least one control element by means of which an approach of a body part of one of the users towards the at least one control element which is actuated upon the actuation action is detected as the action. According to a further embodiment, the detection unit may comprise the at least one control element and an operation signal generated upon actuating the at least one control element is used as the action signal. According to a further embodiment, the detection unit may comprise at least one seat occupancy detection unit which indicates an occupancy of at least one vehicle seat by one of the users and detects a sitting of one of the users on the at least one vehicle seat as the action. According to a further embodiment, the transmitting means may comprise one or more transmission units, each of which is associated with one vehicle seat and provide a HF signal specific for the vehicle seat or a group of vehicle seats this vehicle seat is a member of, for a coupling into one of the users sitting on the respective vehicle seat and the receiving means may comprise at least one receiving unit, which is located in spatial proximity to the one or the several control elements such that upon the actuation action, which comprises an actuation of the one or of one of the several control elements, the user-specific high frequency transmission path is formed. According to a further embodiment, the transmitting means may comprise at least one transmission unit, which is located in spatial proximity to the one or the several control elements such that upon the actuation action which comprises an actuation of the one or of one of the several control elements the user-specific high frequency transmission path between the transmission unit and the receiving means is formed, and the receiving means may comprise one or more receiving units, each of which is associated with one vehicle seat and are located such that one of the users who is sitting on the respective vehicle seat upon a carrying out of the actuation action forms the user-specific high frequency transmission path between the transmitting means and the receiving unit associated with the respective vehicle seat.

According to another embodiment, a method for generating a user recognition signal upon an actuation action of at least one user out of several users in a vehicle by means of a discrimination device, may comprise the steps of: carrying out a user discrimination by means of the discrimination device to identify the at least one user, and generating a user recognition signal identifying the at least one of the users, wherein by means of at least one detection unit an action of one of the users is detected or a presence of the action is monitored, and upon the detection of the action an action signal is generated, and by means of the action signal the discrimination device is controlled such that it is activated only after or upon the existence of the one action signal.

According to a further embodiment of the method, the discrimination device may comprise a control unit as well as transmitting means and receiving means which are associated with the control unit and are located with respect to each other such that between them upon the actuation action of the at least one user via his/her body a user-specific high frequency transmission path is formed and the method may further comprise the following steps: providing at least one HF signal by means of the transmitting means, receiving the HF signal transmitted via the body of the at least one user by means of the receiving means, evaluating the HF transmission to detect the user-specific transmission path and thereby to identify the at least one user, and generating an user recognition signal identifying the at least one of the users, wherein by means of the at least one detection unit an action of one of the users is detected or a presence of the action is monitored and upon the detection of the action the action signal is generated, and the transmitting means are controlled by means of an activation unit such that the transmitting means provide the at least one HF transmission signal at the activation unit only after or upon the existence of the one action signal. According to a further embodiment of the method, the at least one detection unit may comprise located in spatial proximity to at least one control element at least one approach detection unit by means of which an approach of a body part of one of the users towards the at least one control element is detected as the action, wherein the actuation action may comprise an actuation of the at least one control element. According to a further embodiment of the method, the detection unit may comprise the at least one control element and as an action an operation signal generated upon actuating the at least one control element may be used as the action signal. According to a further embodiment of the method, the detection unit may comprise at least one seat occupancy detection unit which indicates an occupancy of at least one vehicle seat by one of the users and a sitting of one of the users on the at least one vehicle seat is detected as the action. According to a further embodiment of the method, the transmitting means may comprise one or more transmission units each of which is associated with one vehicle seat and in each case after or upon the existence of the one action signal provide a HF transmission signal specific for the vehicle seat or specific for a group of vehicle seats for a coupling into one of the users sitting on the respective vehicle seat and the receiving means may comprise at least one receiving unit located in spatial proximity to the one or to the several control elements such that upon the actuation action comprising an actuation of the one or of one of the several control elements the user-specific high frequency transmission path is formed such that the at least one HF transmission signal transmitted via the user-specific high frequency transmission path is received by means of the at least one receiving unit. According to a further embodiment of the method, the receiving means may comprise one or more receiving units each of which is associated with one vehicle seat and are located such that one of the users sitting on one of the respective vehicle seats upon a carrying out of the actuation action forms the user-specific high frequency transmission path between the transmitting means and the receiving unit associated with the respective vehicle seat and in each case the respective HF transmission signal transmitted via the user-specific high frequency transmission path is received by means of the associated receiving unit and the transmitting means may comprise at least one transmission unit located in spatial proximity to the one or the several control elements such that upon the actuation action comprising an actuation of the one or of one of the several control elements the user-specific high frequency transmission path is formed between the transmission unit and the receiving means and the at least one HF transmission signal is provided after or upon the existence of the one action signal.

BRIEF DESCRIPTION OF THE DRAWINGS

In the following the invention is described in more detail with the help of exemplary embodiments and with reference to a drawing. In this connection.

DETAILED DESCRIPTION

Figure 1:
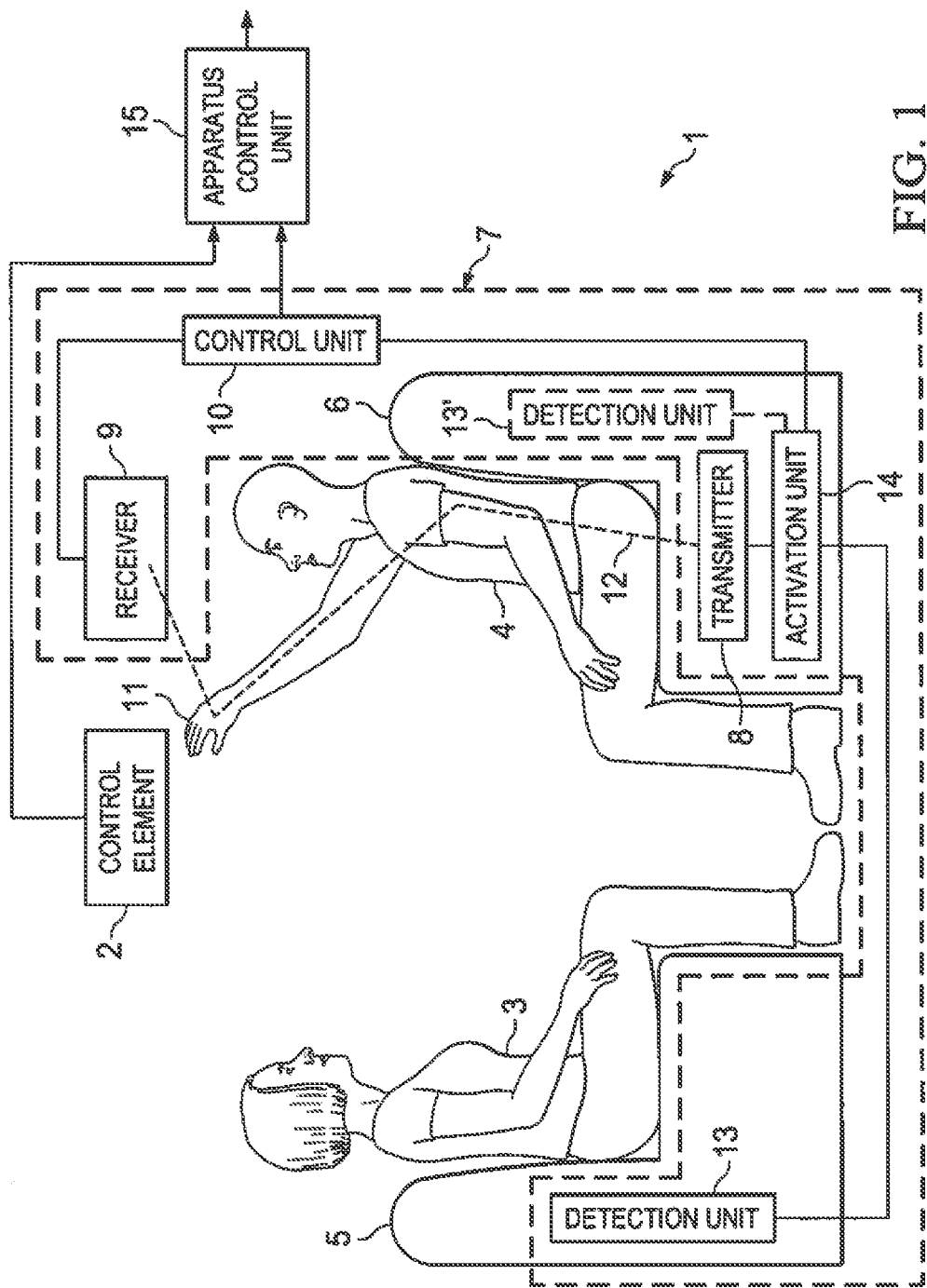
FIG. 1 is a schematic illustration of an operating apparatus comprising a user recognition according to a first embodiment comprising an operating apparatus.

According to various embodiments, an active user recognition for generating the user recognition signal only or only then is carried out when an action signal is present which indicates that a user recognition for the purpose of discrimination is reasonable. Thus, at least most of the components may be deactivated or stay switched off or be switched off as long as no action signal is present. The action signal itself is generated or deduced without an operation or action of the user targeted towards the activation of the user recognition.

Proposed is a device for generating a user recognition signal upon an actuation action of at least one user out of several users in a vehicle comprising a discrimination device to generate the user recognition signal identifying at least one of the users, wherein at least one detection unit, by means of which upon a detection of an action of one of the users at least one action signal is generated, is communicatively coupled with the discrimination device, so that the discrimination device is or will be activated only after or upon the existence of the one action signal.

Analogously, proposed is a method for generating a user recognition signal upon an actuation action of at least one user out of several users in a vehicle by means of a discrimination device comprising the steps of: conducting a user discrimination by means of the discrimination device in order to identify the at least one user and generating a user recognition signal identifying the at least one of the users, wherein by means of at least one detection unit an action of one of the users is detected and/or a presence of the action is monitored, and upon the detection of the action an action signal is generated, and by means of the action signal the discrimination device is controlled such that it is activated only after or upon the existence of the one action signal.

In particular, proposed is a device for generating a user recognition signal upon an actuation action of at least one user out of several users in a vehicle which comprises a control unit as well as sending and receiving means coupled with the control unit and are arranged with respect to each other such that upon the actuation action of the at least one user by means of his/her body a user-specific high frequency transmission path is formed between them, by means of which a HF signal is transmitted, wherein the control unit is designed to evaluate the HF signal transmission in order to generate the user recognition signal identifying at least one of the users, wherein at least one detection unit, by means of which upon a detection of an action of one of the users at least one action signal is generated, is coupled with an activation unit, and the activation unit is arranged to activate the transmitting means only after or upon the existence of the one action signal. In a method as mentioned at the beginning for generating a user recognition signal upon an actuation action of at least one user out of several users in a vehicle by means of a control unit as well as transmitting means and receiving means, which are associated with the control unit and are arranged with respect to each other such that upon the actuation action of the at least one user by means of his/her body a user-specific high frequency transmission path is formed between them, the following steps are arranged for: providing at least one HF signal by means of the transmitting means, receiving by means of the receiving means the HF signal transmitted by means of the body of the at least one user, evaluating the HF transmission of the HF signal in order to detect the user-specific transmission path and to identify thereby the at least one user, and generating a user recognition signal identifying the at least one of the users, wherein by means of at least one detection unit an action of an user is detected or a presence of the action is monitored and upon the detection of the action an action signal is generated and the transmitting means are controlled by way of an activation unit such that the transmitting means provide the at least one HF signal only after or upon the existence of the one action signal. The various embodiments have the advantage that only upon or after a detection of an action also HF signals are provided which are coupled into the user or the users. Thereby, a unneeded signal coupling is avoided. A reduction of HF coupling reduces possible interference which may be caused by the HF signals in other electronic components which a user of the vehicle uses in addition to the components of the vehicle. Further, an exposure of the organism of the users to the HF transmission signals is reduced. In fact, such an exposure is not considered to be harmful, however, due to the high number of technical devices emitting energy in the HF range a reduction is desirable. Furthermore, electrical energy is saved.

In an embodiment it is provided for that the at least one detection unit comprises at least one approach detection unit arranged in spatial proximity with the at least one control element by means of which an approach of a body part of one of the users towards the at least one control element is detectable or is detected as an action. Such an embodiment has the advantage that an approach towards the control element is detected independent of a detection of a transmission of HF signals. Only in this case, when the approach of a body part of the user towards one of the control elements is detected, the approach is detected as an action and an activation of the transmitting means for a subsequently required user discrimination is carried out, so that at least one HF signal for coupling into at least one of the users is provided.

The proximity sensor and the approach detection unit, respectively, may for example be an infrared reflection system in which electro-magnetic radiation is emitted into a defined spatial area in front of or around the control element and a reflection of the infrared radiation upon a penetration into a predefined limited spatial area is detected as an approach. For example, the emission of the infrared radiation may be carried out by way of one or more light emitting diodes. The reflected infrared radiation may be detected by means of one or more photo diodes sensitive in the infrared wavelength range.

In another embodiment in addition or as an alternative it is provided for that the detection unit comprises the at least one control element and an operation signal generated upon actuation of the at least one control element is used as an action signal. In this embodiment the HF transmission may only be activated during the operating action and/or directly thereafter. Since the durations required for an evaluation of the operation signal and action signal, respectively, their transmission and the time period required for an activation of the transmitting means is short as compared to the time period during which a human operating action is carried out, it is entirely sufficient to only activate the HF signal transmission when the operating action already was or is carried out. Since the HF signal transmission by means of the user-specific high frequency transmission path in each case is carried out by way of a capacitive coupling and decoupling, a transmission of the high frequency signal even then still is feasible when the user, as it is for example feasible during an operation of an control element formed as a button, already again removes his/her body part used for operation, in particular a finger, from the control element while the HF signal transmission takes place. Also in such a case, a reliable detection of the HF signal transmission is warranted.

In order to avoid an unnecessary provision of HF signals when a seat of the vehicle is not occupied it is provided for in one embodiment that the detection unit comprises at least one seat occupancy detection unit which indicates a occupancy of at least one vehicle seat by on of the users and detects a sitting of one of the users on the at least one vehicle seat as an action. In this connection embodiments are feasible in which upon an occupancy of the vehicle seat monitored by the seat occupancy unit a provision of a HF signal is activated at another vehicle seat. Likewise it is of course possible that upon a detected occupancy a provision of the HF signal is carried out at the respective vehicle seat. Likewise it is possible to provide for in some embodiments that several action signals are required to activate a provision of HF signals at least at some vehicle seats.

In an embodiment it is provided for that the transmitting means comprise one or more transmission units, each of which is assigned to one vehicle seat, and to provide a specific HF signal for the vehicle seat, or a group of vehicle seats this vehicle seat belongs to, for coupling into one of the users sitting on the respective vehicle seat. Thereby, an unambiguous discrimination also is feasible in the case of more than two users or user groups. For example, if a control element is arranged such that aside from the driver and co-driver it may also be actuated by a passenger on a rear seat it may be desirable, for example when it is a matter of a volume control, to discriminate the driver, the co-driver and the rear passengers as distinct persons or groups. Particularly in a case where more than two users shall be distinguished reliably and/or a multiple use of a control element, for example simultaneous use of a touchscreen by several different users is to be detected reliably, such an embodiment, in which a specific HF signal is assigned to each individual vehicle seat or to each group of vehicle seats, is to be preferred.

User-specific and vehicle-specific HF signals, respectively, for example may differ with respect to their frequency, their modulation and/or a temporal sequence and time periods in which they are provided.

In one embodiment the receiving means are formed such that they comprise at least one receiving unit which is arranged in spatial proximity to the one or the several control elements such that upon the actuation action comprising an actuation of the one or one of the several control elements the user-specific high frequency transmission path is formed. This means that the receiving unit which shall ensure a provision of a user recognition signal for a control element upon its actuation is arranged such that a capacitive coupling of the high frequency signal, which is transmitted by way of the body of the user, is received reliably comprising sufficient signal strength. In this connection it is absolutely feasible to use a receiving unit ensuring this for several control elements positioned side by side and spaced from each other.

In another embodiment it is provided for that the receiving means comprise one or more receiving units, each of which is assigned to one vehicle seat and are arranged such that one of the users sitting on the respective vehicle seat forms the user-specific high frequency transmission path between the transmitting means and the receiving unit associated with the respective vehicle seat upon carrying out the actuation action. A user recognition may be carried out here by evaluating by means of which receiving unit high frequency signals have been transmitted.

Further, one embodiment provides for that the transmitting means comprise at least one transmission unit which is arranged in spatial proximity to the one or the several control elements such that upon the actuation action comprising an actuation of the one or of one of the several control elements the user-specific high frequency transmission path is formed between the transmission unit and the receiving means.

Therefore, two different directions of transmission are feasible which may be applied alternatively or in combination. In the one direction of transmission the high frequency signals are coupled into the user in proximity or in the vehicle seats and are received by means of receiving units adjacent to the one or more control elements. In the other direction of transmission a frequency signal coupling into the body of the user takes place adjacent to the one or more control elements and several receivers are associated with the vehicle seats. Different control element groups may be formed for different directions of transmission. In this connection it is advantageous to use high frequency signals comprising different frequencies, so that interference between the two directions of transmission is avoided. Furthermore, the possibility is created thereby to realize complex operating scenarios in which it is required, for example, that the user touches a control element, for example a steering wheel, while he/she operates another control element arranged in a spaced manner. When the steering wheel for example comprises a transmission unit and a respective receiving unit is accommodated in the driver's seat, in addition a transmission unit may be accommodated in the driver's seat and a receiving unit adjacent to a control element in the center console which for example is formed as a touchscreen or as a dual view display.

Of course, two or more operating areas may be provided for which comprise sending or receiving units formed separately and are formed such that by means of these the actuations carried out simultaneously by different users within the different operating areas may be evaluated and to the two actuation actions and the thereby generated operation signals, respectively, user identifiers may be assigned.

In some embodiments it is provided for that the transmitting means only stay active as long as the at least one action signal is existent. This is reasonable when an approach towards the at least one control element or the actuation of the at least one control element are detected as an action. Likewise, however, it is also feasible to carry out the activation for a predefined time period only.

The characteristics of the method according to various embodiments offer the same advantages as the respective characteristics of the device.

Besides a HF transmission also other principles may be utilized for distinguishing the users. A discrimination may be carried out by way of optical methods and devices which evaluate camera images. Likewise, systems may be utilized which use photoelectric barriers, for example photoelectric barriers operated using IR radiation. Yet further systems evaluate a reflection of emitted IR light in order to carry out a determination of a distance to objects. In case distances of the same object, for example a hand of a user, are determined from several positions, then, by means of a triangulation, the position of the object, and from several monitoring actions a trajectory may be derived which allow a user discrimination on the basis that, for example, driver and co-driver approach a control element in a center console from different sides.

Depicted in FIGS. 1 to 6 are in each case schematically differing embodiments of an operating apparatus 1 of a vehicle. The operating apparatus 1 comprises a control element 2 which is provided for detecting user inputs. The control element 2 may have an arbitrary embodiment. In particular, it may be a touchscreen, a turn/press switch, a push-button or any other control element, for example also a steering wheel, a joystick and so forth. The control element is formed such that it may be actuated by different users 3, 4 by means of an actuation action. The users 3, 4 may for example be a driver and a co-driver of the vehicle, in case the vehicle is a passenger car, for example. The users 3, 4 each are located on a vehicle seat 5, 6. Each of the users 3, 4 is distinctly associated with one of the vehicle seats 5, 6 on which he/she in particular is located in a sitting manner. In order to distinguish which of the users 3, 4 has carried out an actuation action to carry out an user input by means of the control element a device 7 is provided for generating an user recognition signal. In the following, for the device 7 for generating an user recognition signal, also the term user recognition device is used synonymously which also is denoted by the reference numeral 7. The user recognition device 7 comprises in FIG. 1 a transmission unit 8 as transmitting means and a receiving unit 9 as receiving means which are connected to each other by means of a control unit 10. In the exemplary embodiment depicted, the transmission unit 8, which is designed to provide high frequency signals, is integrated into the vehicle seat 6 such that in the active state, in which the transmission unit 8 provides a high frequency signal for coupling, it couples into the body of the user 4 sitting on the vehicle seat 6. When the user 4 upon actuating the control element 2 approaches a body part, for example his/her hand 11, towards this control element 2, then a user-specific high frequency transmission path 12 is formed between the transmission unit 8 and the receiving unit 9 via the body of the user 4. In this embodiment, the vehicle seat 5 associated with the user 3 is not provided with a transmission unit. The control unit 10 therefore may explicitly identify the user 4, for example the co-driver, by detecting the reception of a high frequency signal when he/she actuates the control element 2 by means of an actuation action to carry out an user input. Consequently, the control unit 10 generates a user recognition signal identifying the user 4 as soon as it detects a HF signal transmission via the high frequency transmission path 12 which proceeds through the body of the user 4. An operating apparatus control unit evaluates both an operation signal of the control element and the user recognition signal in order to trigger in a user related manner a function associated with the control element 2. However, when the user 3 carries out an actuation action, i.e. in this example the driver, for example, no reception of a high frequency signal is detected by the control unit 10.

In an embodiment, not outputting an user recognition signal may be interpreted as a user recognition signal identifying one of the users 3, 4.

In order to avoid an unnecessary coupling and an unnecessary provision of the high frequency signal, respectively, by the transmission unit 8 a detection unit 13 is provided for which detects an action of one of the users 3, 4. The detection unit 13 generates an action signal when it has detected an action of one of the users 3, 4. The action signal is evaluated by means of an activation unit 14 which controls an activation of the transmitting means depending on the action signal.

In the embodiment of FIG. 1 the detection unit is formed as a seat occupancy sensor and is associated with vehicle seat 5 into which no transmission unit of the transmitting means is integrated. Assuming that the user designated by reference numeral 4 is the driver, then he/she is reliably detected as the user without a high frequency signal being transmitted by means of the high frequency transmission path 11 proceeding through his/her body as long as the co-driver designated by the reference numeral 3 is not sitting on the vehicle seat 5 in which the detection unit 13 is formed as a seat occupancy unit. However, when the user 3 (co-driver) is sitting on the vehicle seat 5 this action is detected by means of the detection unit 13 and by means of the activation unit 14 a provision of the high frequency signal by means of the transmission unit 8 is caused. When an actuation of the control elements 2 is carried out by the user 3 (co-driver) no high frequency signal is detected simultaneously by the receiving unit 9. The control unit 10 evaluating the high frequency signal transmission thus generates a user recognition signal which identifies the co-driver as the user 3 carrying out an actuation. The operation signal generated by the control element upon an actuation is evaluated by an operating apparatus control unit 15 together with the user recognition signal to thereby cause a function triggering in a user related manner, a function control in a user related manner, and so forth.

An alternative embodiment may provide for that also in the vehicle seat 6 a further detection unit 13' is integrated alternatively or in addition to the detection unit 13. This unit 13' preferably also is formed as a seat occupancy unit. Thereby other scenarios may be realized. In vehicles in which the vehicle seats 5, 6 may be used alternatively, for example, thereby it may be achieved that the high frequency signal from transmission unit 8 only is provided when both vehicle seats 5, 6 are occupied by two user 3, 4. In all remaining situations the user recognition signal may be directly detected by means of the action signals (here: seat occupancy signals) generated by the detection unit 13 and the further detection unit 13'.

Here, information lines directly linked to the control unit 10 are not illustrated for reasons of simplification. Likewise, it is feasible to integrate the activation unit 15 into the control unit 10.

Figure 2:
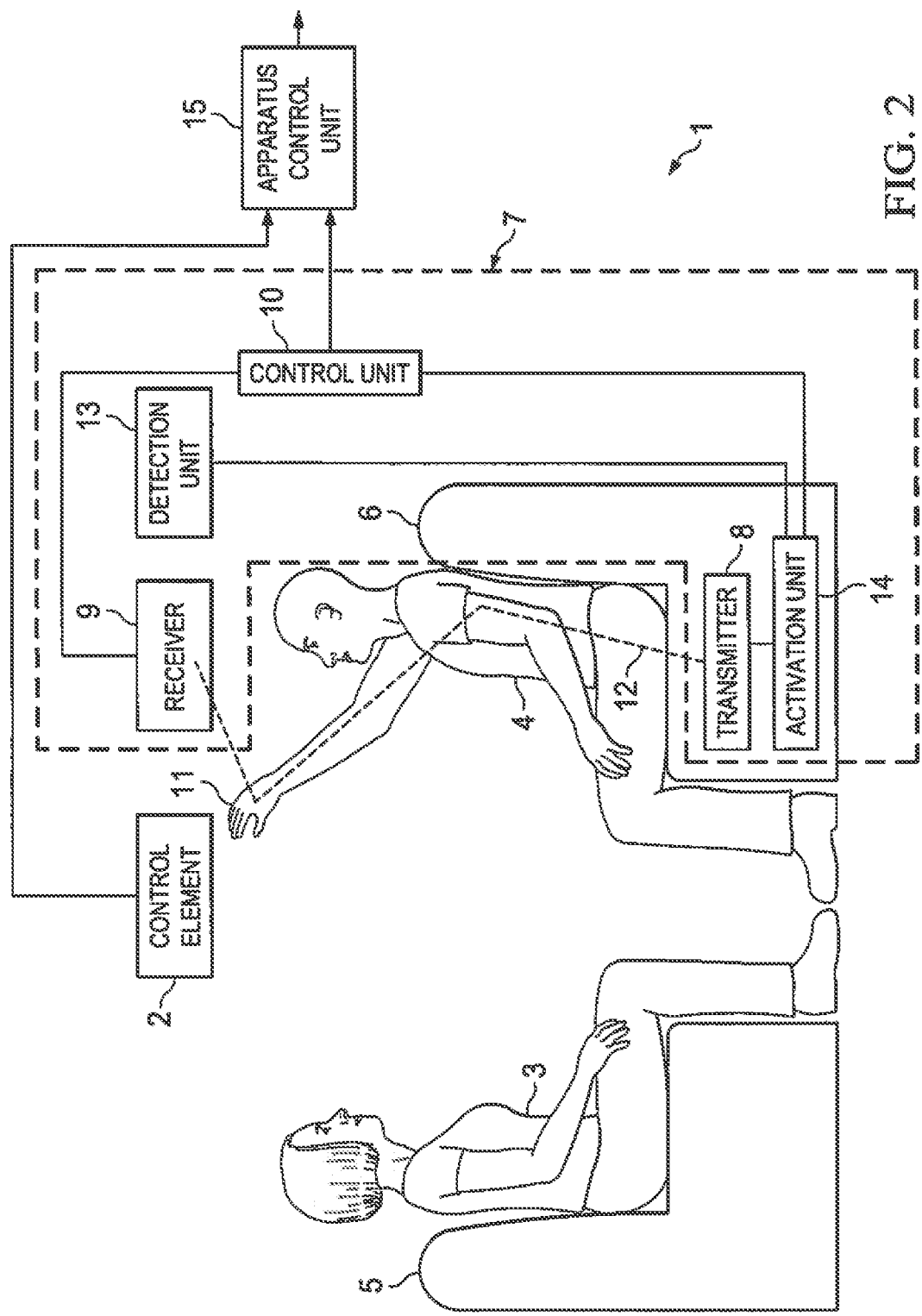
FIG. 2 is a schematic illustration of a second embodiment of an operating apparatus comprising a user recognition, in which the at least one detection unit is formed as a proximity sensor.

Illustrated in FIG. 2 is a further embodiment. In all Figures like technical characteristics are denoted by like reference numerals. Also in this embodiment a transmission unit 8 of the transmitting means solely is integrated into the vehicle seat 6. In this embodiment a detection unit 13 is provided for, which is located adjacent to the control element 2 such that it may detect an approach of a body part of one of the users 3 or 4 upon an intended or carried out actuation of the control element 2. The detection unit 13 thus is designed as a proximity sensor. Advantageously, such proximity sensors may for example evaluate a reflection of emitted electro-magnetic radiation in the infrared wavelength range. However, used as the detection unit 13 may be also any other proximity sensors well-known to a person skilled in the prior art. In this embodiment an approach towards the control element 2 upon an actuation action is detected as an action. As soon as an approach towards the control element 2 is detected an action signal is generated which in turn causes the activation unit 14 to couple, by means of the transmission unit 8, into the user 4 sitting on the vehicle seat 6 a high frequency signal which upon an actuation action by the user 4 by means of the body of the user 4 is transmitted to the receiving unit 9 by means of the high frequency transmission path 12 formed by the user. Thus, when a high frequency transmission is detected by the control unit 10 a signal identifying the user 4 is output as the recognition signal. In contrast, when no high frequency transmission is detected by the control unit 10 then a user recognition identifying the user 3 is output as the user recognition signal since the actuation must have been carried out by the user 3. It is to be noted that by way of an actuation action of the control element 2 by the user 3 a high frequency coupling into the user 4 is triggered.

In one embodiment the user 3 is the driver and the user 4 is the co-driver. In another embodiment the user 3 is the co-driver and the user 4 is the driver.

For example, this is reasonable when certain actuation actions influencing the driving behaviour of the vehicle which are detected by means of the control element 2 are to be safeguarded and in no case are allowed to be carried out by the co-driver.

Figure 3:
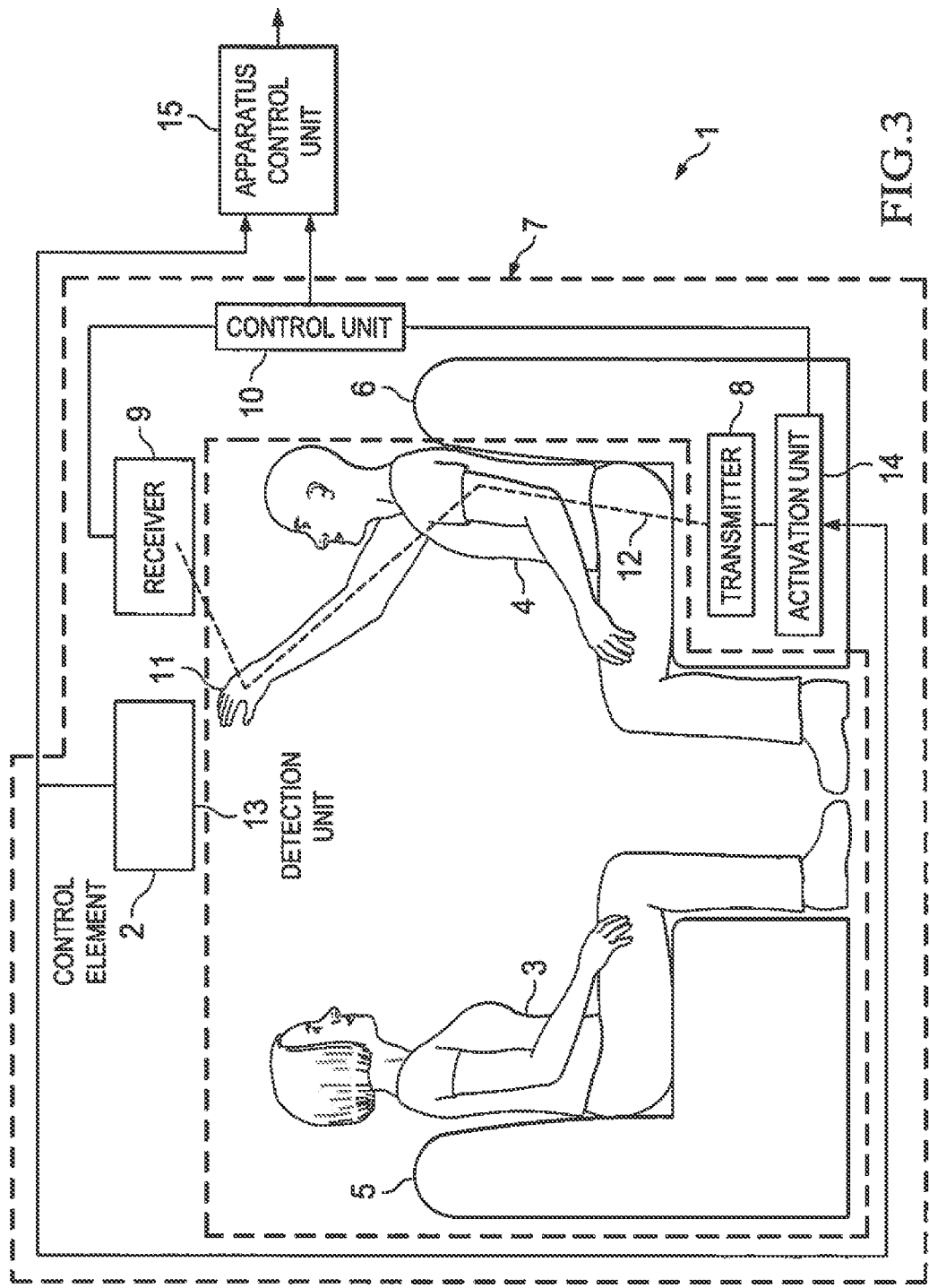
FIG. 3 is a schematic illustration of an operating apparatus comprising a device for user recognition, wherein the control element used for operating is utilized as the detection unit.

Shown in FIG. 3 is a further embodiment of an operating apparatus 1 of a vehicle in which the control element 2 at the same time is used as the detection unit 13. This means that the operation signal is evaluated as an action signal by means of the activation unit 14. Since a signal transmission and an activation is carried out fast as compared to a human movement it is entirely sufficient to only start the provision of the high frequency signal during or directly after an actuation action of the control element 2 has taken place. Since the high frequency signal is capacitively coupled into and decoupled from the user 4 a physical contact to the control element 2 at the time of the reception of the transmitted high frequency signal is not required. Thus, a reliable user recognition by means of the control unit 10 which evaluates the high frequency signal transmission may be carried out reliably also in this case. Otherwise the embodiment resembles that of FIG. 2.

Figure 4:
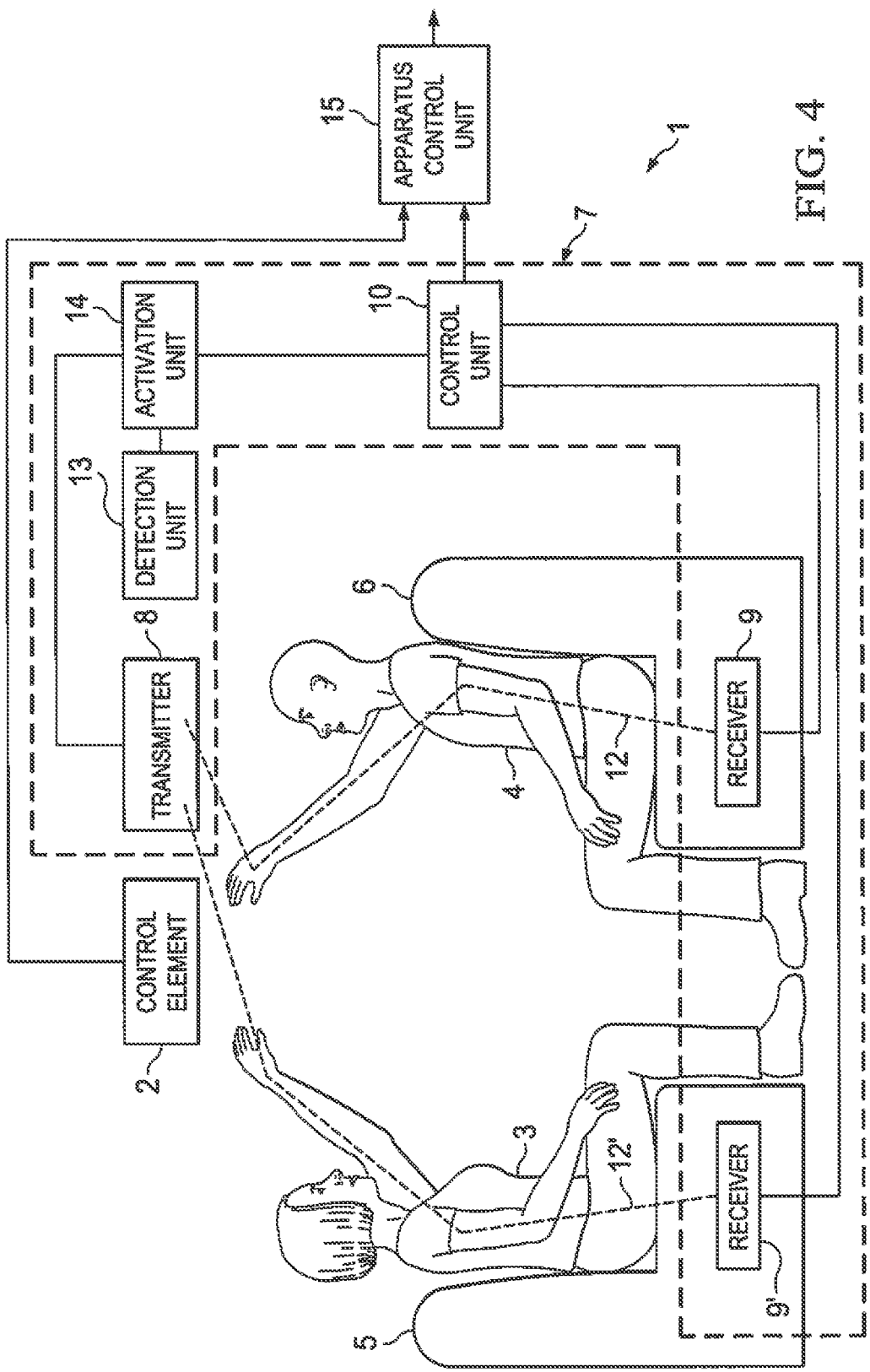
FIG. 4 is a schematic illustration of an operating apparatus of a motor vehicle according to a further embodiment in which both vehicle seats are formed comprising an associated receiving unit.

Illustrated in FIG. 4 is a further embodiment of an operating apparatus 1 in which the transmission unit 8 of the transmitting means is located adjacent to the control element 2. In addition, provided for as a detection unit 13 for detecting an action of one of the users 3, 4 is a proximity sensor. In this embodiment receiving units 9, 9' of the receiving means are respectively integrated into the vehicle seats 5, 6. Depending on which of the users actuates the control element 2 a high frequency transmission path 12 via the user 4 and a further high frequency transmission path 12' via the user 3, respectively, are formed between the transmission unit 8 and one of the receiving units 9, 9'. The control unit 10 evaluates by means of which user-specific high frequency transmission path 12, 12' the high frequency signal is transmitted. Accordingly, the user recognition signal is generated. Furthermore, this embodiment has the advantage that also a simultaneous usage of the control element, which for example may be formed as a touchscreen or even as a dual view or MultiView touchscreen, is detected reliably. In such a case further precautionary measures have to be taken in order to discriminate which contact position on the control element 2 is to be associated with which of the users 3, 4. Otherwise the embodiment resembles that of FIG. 2.

Figure 5:
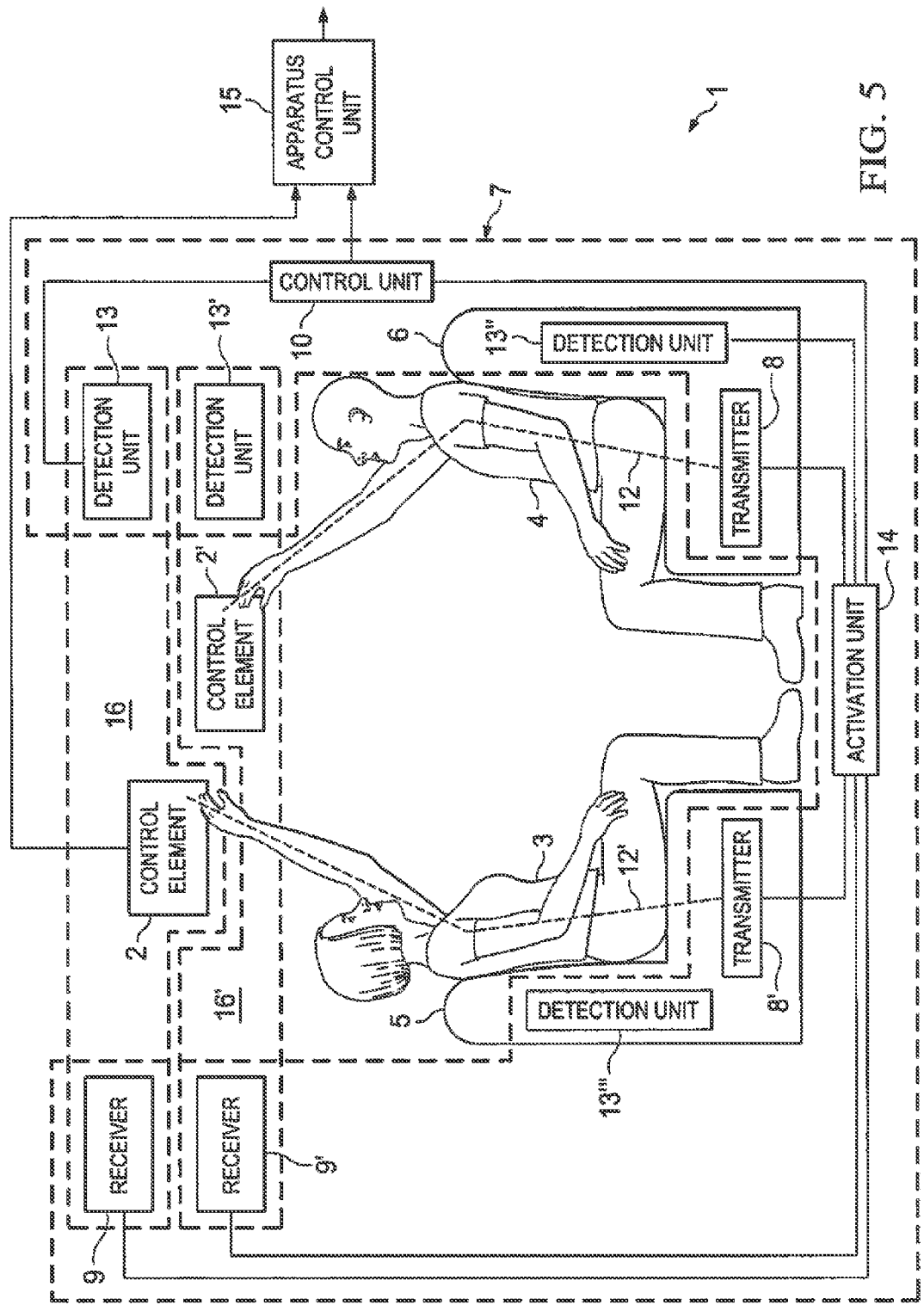
FIG. 5 is a schematic illustration of an operating apparatus of a motor vehicle comprising an user recognition device which covers several operation areas.

Illustrated in FIG. 5 is yet a further embodiment in which into each of the vehicle seats 5, 6 in each case a transmission unit 8, 8' of the transmitting means is integrated. Furthermore, several control elements 2, 2' are provided for which in each case are separately located together with receiving units 9, 9' associated with these control elements. In addition, a particular detection unit 13, 13' is associated with each control element.

The control element 2 and the receiving unit 9 form an operation region 16. The control element 2 and the receiving unit 9 form a further operation region 16'. The two operation regions 16, 16' each independent of each other may support the detection of an actuation by exactly one of the users 3, 4. When in the operation regions 16, 16', respectively, an actuation is only carried out by one of the users 3, 4 then the respective user 3, 4 may be detected reliably. For example, user 4 will actuate the control element 9 while simultaneously user 3 actuates the control element 2'.

The operation regions 16, 16' here each also comprise an own user detection unit 13, 13'. This is not required. If, for example, a proximity sensor is able to detect an approach both at the one operation region 16 and at the other operation region 16' one user detection unit is sufficient for both operation regions 16, 16'.

It unfolds for one skilled in the art that in lieu of the control element 2, 2' several control elements may be located in the respective individual operation regions.

When an actuation action of one of the users 3, 4 is detected by one of the detection units 13, 13' formed as proximity sensors a respective action signal is output to the activation unit 14. This actuates the transmission units 8, 8' so that these provide high frequency signals which are coupled into the users 3, 4. The high frequency signals provided by the different transmission units 8, 8' may be formed differently, for example may have differing frequencies and/or may be differently modulated high frequency signals. For example, the transmission units 8, 8' may be formed such that they provide in a time shifted manner alternating high frequency signals having the same frequency. By means of a correlation of the temporal reception of the high frequency signals transmitted via the high frequency transmission paths 12, 12' the control unit 10 is able to identify the user 3, 4 and the respective high frequency transmission path 12, 12', respectively, and hence to carry out a user recognition and an allocation.

Furthermore, it is feasible in this embodiment that the user 3 and the user 4 use the control elements 2 and 2' simultaneously and nevertheless a reliable user recognition and allocation is possible. In this case, introduced to the user recognition signal in addition may be an identifier which identifies the respective receiving unit 9, 9' to which a user recognition is assigned. For example, if the user 3 actuates the control element 2, then the identifier of the receiving unit 9 associated with the control element 2 would be added to the user recognition signal of the user recognition of the user 3. Thereby the operating apparatus control unit 15 is able to associate the individual operation signals with the individual users 3, 4 explicitly and reliably. Additionally provided for in this embodiment are further detection units 13" and 13'" which accordingly are integrated into the vehicle seats 5 and 6 as seat occupancy sensors. Thereby it is ensured in addition that a high frequency signal coupling only takes place when both vehicle seats 5, 6 in fact are occupied. Again, signal lines from the detection units 13' and 13'" to the control unit 10 are not plotted for reasons of simplification. Likewise, as in all embodiments, it is of course feasible that the activation unit is directly integrated into the control unit 10.

Figure 6:
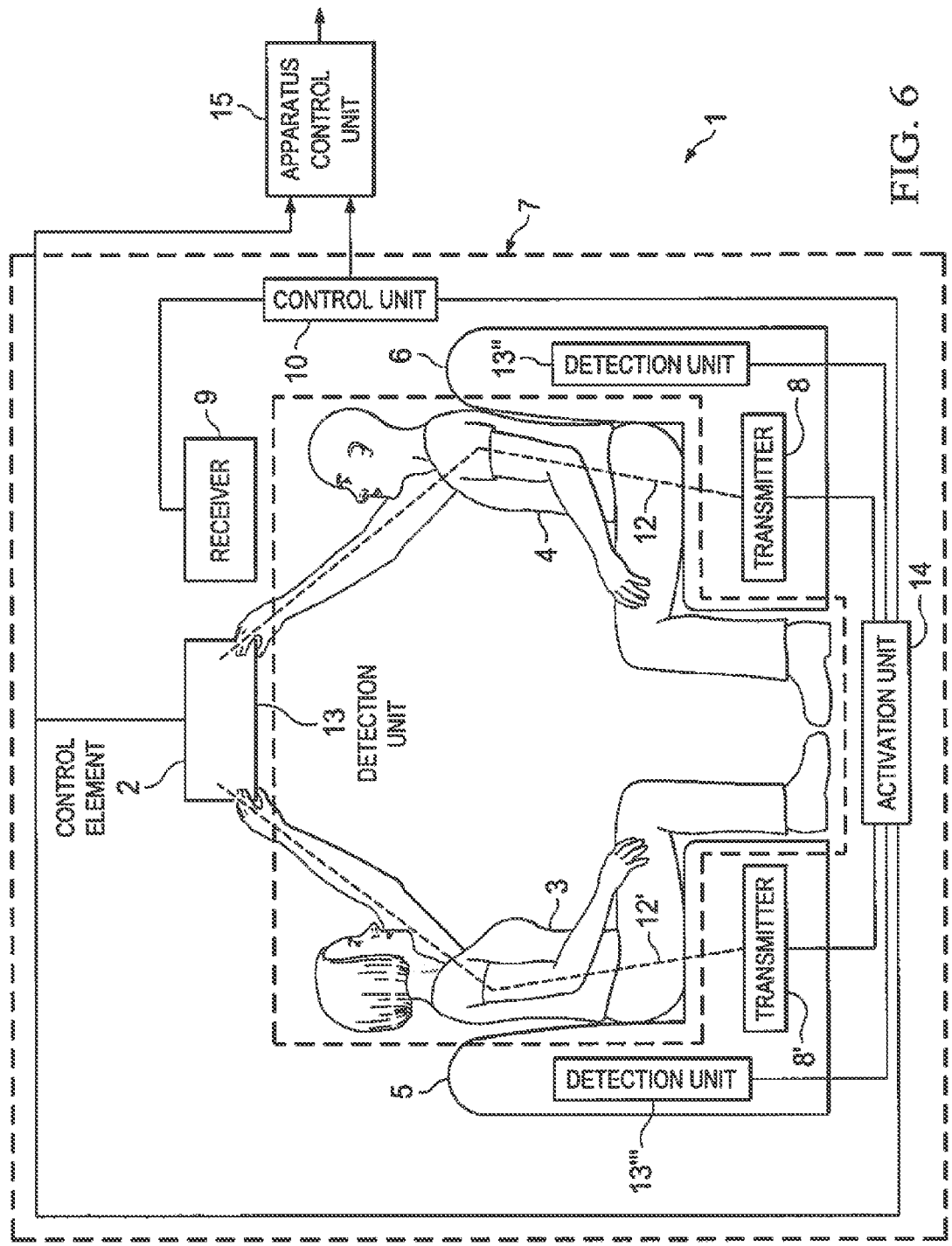
FIG. 6 is a schematic illustration of an operating apparatus of a vehicle in which an operation signal of a control element is used as an action signal for activating the provision of HF signals.

Illustrated in FIG. 6 is a further embodiment of an operating apparatus 1 of a vehicle in which again the control element 2 at the same time is used as the detection unit 13 for detecting an action of one of the users 3, 4. Again, in this embodiment transmission units 8, 8' of the transmitting means are integrated into the vehicle seats 5, 6. These are activated when an actuation of the control element 2 is carried out by one of the users 3, 4 and the operation signal as an action signal actuates the activation unit 14 such that the transmission units 8, 8' are caused to provide a high frequency signal.

The described embodiments solely constitute exemplary embodiments of an operating apparatus comprising a device for generating an user recognition signal. It unfolds for one skilled in the art that the individual described characteristics may be combined with each other arbitrarily to realize other embodiments. In particular it is feasible that further vehicle seats and further users may operate individual control elements. Likewise it may be provided for that for example all vehicle seats in the rear of a vehicle are regarded as a group and the users located thereon are regarded as a user group. Embodiments are conceivable in which it is required for the operating apparatus to detect whether an operation has been carried out by a driver, a co-driver or a passenger on a rear seat, however, not which of the passengers in the rear of the vehicle has carried out the actuation action. In such a case the aggregation of the users in the rear and of the vehicle seats in the rear into one group is reasonable.

Further, it is feasible in other embodiments to use other principles for a user discrimination. Camera based systems, tracking systems, or the like may be applied.

REFERENCE NUMERALS 1 operating apparatus
2, 2' control elements
3, 4 users
5, 6 vehicle seats
7 device for generating a user recognition signal (user recognition device)
8, 8' transmission unit
9, 9' receiving unit
10 control unit
11 hand
12, 12' high frequency transmission path
13, 13', 13", 13''' detection unit
14 activation unit
15 operating apparatus control unit
16, 16' operation regions

What is claimed is:

1. A system for user seat location recognition and control in a vehicle, the system comprising:
   a control element including a physical interface for interaction with a user seated in the vehicle, the control element configured to provide functionality dependent on a seat location of the user interacting with the interface,
   a seat occupancy sensor arranged in the seat of the user in the vehicle configured to detect the presence of the user in the seat,
   a discrimination device configured to, upon activation by a control unit:
      activate a transmitter to transmit wireless signals in the vehicle,
      receive the transmitted wireless signals by a receiver in the vehicle, and
      in response to the received wireless signals, generate a user seat location recognition signal identifying the seat location of the user in the vehicle interacting with the interface,
   wherein the control element is configured to receive the user seat location recognition signal and provide functionality dependent on the identified seat location of the user in the vehicle interacting with the interface, and
   a detection unit configured to detect an activation action of the user by touching or physically approaching the control element, and
   a control unit configured to activate the discrimination device to transmit wireless signals only when (a) the detection unit detects a user touching or physically approaching the control element and (b) the seat occupancy sensor senses the presence of the user in the seat of the vehicle.

2. The system according to claim 1,
   wherein the transmitter and receiver of the discrimination device are located with respect to each other to define a user-specific high frequency transmission path through the user, through which a high frequency (HF) signal is transmitted,
   the control unit designed to evaluate the HF signal transmission in order to generate the user recognition signal identifying the seat location of the user,
   the control unit coupled with an activation unit designed to activate the transmitter of the discrimination device only upon detection of the user touching or physically approaching the control element by the detection unit and sensing the presence of the user in the seat by the seat occupancy sensor.

3. The system according to claim 1, wherein the detection unit comprises an approach detection unit located in spatial proximity to the control element wherein an approach of a body part of a user towards the control element is detected as the activation action.

4. The system according to claim 1, wherein the detection unit comprises the control element and an operation signal generated upon actuating the control element is used as the activation signal.

5. The system according to claim 1, wherein the transmitter comprises one or more transmission units, each of which is associated with one vehicle seat and provides a HF signal specific for the vehicle seat or a group of vehicle seats of which this vehicle seat is a member, for a coupling into a user sitting on the vehicle seat and the receiver comprises a receiving unit, which is located in spatial proximity to the control element such that upon the activation action, a user-specific high frequency transmission path is formed.

6. The system according to claim 1, wherein the transmitter comprises a transmission unit located in spatial proximity to the control element such that upon the activation action, a user-specific high frequency transmission path between the transmission unit and the receiver is formed, and the receiver comprises one or more receiving units, each of which is associated with one vehicle seat and are located such that when a user sitting on the respective vehicle seat carries out the activation action, the user-specific high frequency transmission path is formed between the transmitter and one or more receiving units associated with the vehicle seat.

7. A method for user seat location recognition and control in a vehicle, comprising:
   detecting the presence of a user in a seat in the vehicle using a seat occupancy sensor arranged in the seat,
   detecting the user touching or physically approaching a user interface of a control element configured to provide functionality dependent on the seat location of the user,
   activating transmission of wireless signals in the vehicle only when (a) the user touching or physically approaching the control element of the user interface is detected and (b) the presence of the user in the seat of the vehicle is sensed, and
   carrying out a user seat location discrimination to identify the seat location of the user touching or physically approaching the user interface, including:
      transmitting wireless signals by a transmitter in the vehicle,
      receiving the transmitted wireless signals by a receiver in the vehicle, and
      in response to the received wireless signals, generating a user seat location signal identifying the seat location of the user touching or physically approaching the user interface.

8. The method according to claim 7, wherein the user seat location discrimination is carried out by a discrimination device comprising the transmitter and the receiver, the transmitter and the receiver of the discrimination device are located with respect to each other to define and form a user-specific high frequency transmission path through the user, and wherein the method further comprises:
- providing at least one HF signal by the transmitter,
- receiving the HF signal transmitted via the body of the user by the receiver, and
- evaluating the HF signal transmitted to detect the user-specific transmission path and thereby to identify the seat location of the user.

9. The method according to claim 7, wherein detecting the user touching or physically approaching the user interface of the control element is carried out by a detection unit that comprises an approach detection unit located in spatial proximity to the control element wherein an approach of a body part of a user towards the control element is detected.

10. The method according to claim 9, wherein the detection unit comprises the control element.

11. The method according to claim 7, wherein the transmitter comprises one or more transmission units each of which is associated with one vehicle seat and after or upon activation of the transmission of wireless signals provide a HF transmission signal specific for the vehicle seat or specific for a group of vehicle seats for a coupling into one of the users sitting on the respective vehicle seat and the receiver comprises a receiving unit located in spatial proximity to the control element such that upon the detection of the user touching or physically approaching the control element of the user interface, a user-specific high frequency transmission path is formed such that the HF transmission signal transmitted via the user-specific high frequency transmission path is received by the receiving unit.

12. The method according to claim 7, wherein the receiver comprises one or more receiving units each of which is associated with one vehicle seat and are located such that one of the users sitting on one of the respective vehicle seats upon a carrying out of the activation action forms a user-specific high frequency transmission path between the transmitter and the one or more receiving units associated with the respective vehicle seat and in each case the respective HF transmission signal transmitted via the user-specific high frequency transmission path is received by the associated receiving unit and the transmitter comprises a transmission unit located in spatial proximity to the control element such that upon the detection of the user touching or physically approaching the control element of the user interface, the user-specific high frequency transmission path is formed between the transmission unit and the receiver and the HF transmission signal is provided after or upon the existence of the detection of the user touching or physically approaching the control element of the user interface.

13. A system for user seat location recognition and control in a vehicle, comprising:
- a control element including a physical interface for an interaction with a user, the control element configured to provide functionality dependent on a seat location of the user interacting with the interface,
- a seat occupancy sensor arranged in a seat of the vehicle, the seat occupancy sensor configured to detect the presence of a person in the seat,
- a detection unit configured to detect an activation action of the user touching or physically approaching the control element,
- a control unit configured to activate a discrimination device to transmit wireless signals only when (a) the user touching or physically approaching the control element is detected and (b) the presence of the user in the seat of the vehicle is sensed,
- the discrimination device coupled with said detection unit and configured to:
- receive an activation signal,
- in response to said activation signal,
    - activate a transmitter to transmit wireless signals in the vehicle,
    - receive the transmitted wireless signals by a receiver in the vehicle, and
    - in response to the received wireless signals, generate a user seat location recognition signal identifying the seat location of the user interacting with the interface.

14. The system according to claim 13, wherein the transmitter and receiver of the discrimination device are located with respect to each other to define a user-specific high frequency transmission path through the user, through which a HF signal is transmitted,
- wherein the control unit is designed to evaluate the HF signal transmission in order to generate the user seat location recognition signal identifying the seat location of the user,
- wherein the detection unit is coupled with an activation unit and the activation unit is designed to activate the transmitter of the discrimination device only upon detection of the user touching or physically approaching the control element by the detection unit.

15. The system according to claim 13, wherein the detection unit comprises an approach detection unit located in spatial proximity to the control element wherein an approach of a body part of a user towards the control element is detected as the activation action to transmit wireless signals.

16. The system according to claim 13, wherein the detection unit comprises the control element and an operation signal generated upon actuating the control element is used as said activation signal.

17. The system according to claim 13, wherein the transmitter comprise one or more transmission units, each of which is associated with one vehicle seat and provides a HF signal specific for the vehicle seat or a group of vehicle seats of which this vehicle seat is a member, for a coupling into a user sitting on the vehicle seat and the receiver comprises a receiving unit located in spatial proximity to the control element such that upon the activation action of the user comprising touching or physically approaching the control element, a user-specific high frequency transmission path is formed.

* * * * *